3,162,432
OLEO STRUT
Leland V. Hall, Culver City, Calif., assignor to Hughes Tool Company, Houston, Tex., a corporation of Delaware
Filed Mar. 27, 1963, Ser. No. 268,414
7 Claims. (Cl. 267—34)

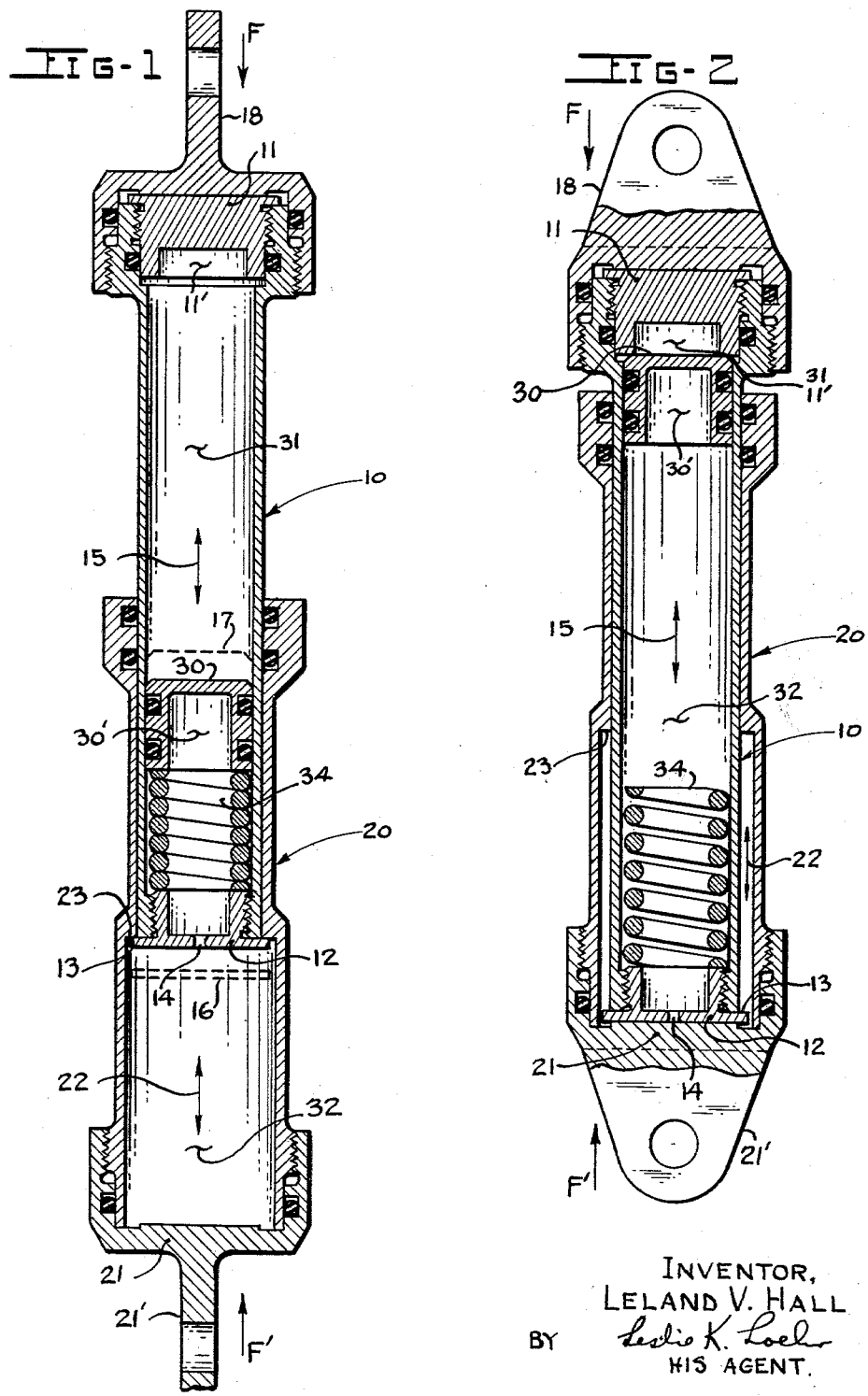

The present invention relates to the art of oleo struts, and more particularly to struts of this character which are suitable for use in aircraft landing gear.

One of the problems involved in the operation of aircraft stems from the impact occurring when an aircraft first touches the ground during a landing maneuver; hence, as a solution to this problem, it is common practice to provide most aircraft with some form of landing gear having built-in shock-absorbing devices for minimizing the forces of impact transmitted to the aircraft at the moment of touchdown, and which also operate for resiliently supporting the aircraft in its proper relationship to the ground when a landing is effected or when the craft is merely standing in a static condition.

Such a shock-absorbing device is commonly identified as an oleo strut which, in general, includes a cylinder and plunger combination arranged for telescopic movement between predetermined extended and contracted positions. The plunger usually comprises a tubular element having an end wall with an opening which constitutes a fluid-conducting passageway interconnecting the interior of the plunger with the cylinder. When the strut is in an operating condition, the cylinder is filled with a suitable liquid and the interior of the plunger is charged with pressurized gas which reacts against the liquid because of the passageway through the end wall of the plunger such that the liquid is pressurized according to the effective pressure of the gas in the plunger. Moreover, because of the expansive properties of the pressurized gas, the cylinder and plunger are continuously urged toward their extended positions by forces proportional to the pressure magnitude of the pressurized gas. Conversely, when external forces are applied to the strut such as to effect telescopic movement of the cylinder and piston from their extended positions toward their contracted positions, the liquid in the cylinder operates to effect a reduction in the space occupied by the gas, which space reduction effects an increase in the pressure magnitude of the pressurized gas in proportion to the amount of such telescopic movement.

To avoid excessive size and weight, struts of the above character employed in aircraft landing gear are made relatively small in relation to their shock-absorbing and load-supporting abilities. Hence, the charge of gas required in the hollow plunger must be pressurized to a relatively high pressure magnitude (unit pressure) so as to provide such struts with adequate standoff ability for supporting an aircraft on the ground after a landing or in a static condition without the struts being compressed the total distance of their telescopic movement to their contracted positions. In other words, to provide adequate standoff ability, the pressure magnitude of the gas must be high enough so as to accommodate a reasonable amount of aircraft bouncing while the craft is on the ground without causing the struts to strike bottom, i.e., reach their contracted positions.

It is recognized by those skilled in the art, that the extent to which the forces of impact are transmitted to a landing aircraft is proportional to the stiffness of the shock-absorbing devices employed in the landing gear; therefore, even though the need for high pressure gas is essential as indicated above, its use in a short-stroked small-diametered oleo strut not only operates to stiffen the strut and thereby decrease its cushioning effect at the moment of touchdown, but it is also responsible for an increase in the rebound tendencies associated with a landing aircraft equipped with such oleo struts.

The present invention contemplates an oleo strut of the above general character which permits the use of high gas pressure for adequate standoff ability, but which avoids the increased stiffness and the decreased cushioning effect as well as the increase in rebound tendencies mentioned above. Briefly, the invention comprises a telescopic structure which employs a free piston slidably responsive to pressurized gas in a plunger for pressurizing a body of liquid in a cylinder, and a spring operating to oppose the effect of the pressurized gas such that the pressure magnitude of the pressurized liquid is less than the pressure magnitude of the gas when the plunger and cylinder are disposed in their telescopically extended positions, and such that the effectiveness of the spring decreases progressively to zero when the telescopic plunger and cylinder are moved a predetermined distance from their extended positions toward their contracted positions under the influence of external forces.

Accordingly, it is an object of this invention to provide an oleo strut suitable for use in aircraft landing gear, and to provide such a strut which can be constructed in a relatively small size.

It is another object to provide such an oleo strut having telescopic members characterized by predetermined extended and contracted positions, and by highly pressurized gas of which the expansive properties act to urge the members toward their extended positions.

It is a further object to provide such an oleo strut in which the effectiveness of the highly pressurized gas is reduced to a predetermined minimum when the telescopic members are disposed in their extended position for minimizing forces of impact occurring at the instant of touchdown of a landing aircraft.

It is another object to provide a strut of the above character which operates such that, when the expansive properties of the pressurized gas are moving the telescopic members toward extended positions, the effectiveness of these properties is gradually counteracted as the members approach their extended positions for minimizing rebounding tendencies of a landing aircraft.

It is another object to provide such a strut in which the effectiveness of the highly pressurized gas is reduced by resilient means operating in opposition to the expansive properties of the gas when the telescopic members are disposed in the region of their extended positions.

It is an additional object to provide a strut of the above character in which the resilient means comprises a spring which operates to oppose the expansive properties of the pressurized gas for a portion of the movement of the telescopic members toward their extended positions.

It is a further object to provide such an oleo strut in which the effectiveness of the spring to oppose the expansive properties of the pressurized gas decreases to zero when the telescopic members have moved a predetermined distance from their extended positions toward their contracted positions.

It is also an object of the invention to provide an oleo strut of the above character in which a free piston is made movably responsive to the pressurized gas such that the pressure magnitude of the gas is transmitted to the body of liquid.

It is another object to provide such an oleo strut in which the spring is employed to yieldably oppose the movement of the piston as the telescopic members approach their extended positions, such that the magnitude of the pressure transmitted to the liquid is less than the pressure magnitude of the gas.

These and other objects and advantages will become more apparent from the following description considered in connection with the accompanying drawing which illustrates the novel features of this invention for descriptive purposes only and which is not intended as a definition of the limits thereof.

In the drawing:

FIG. 1 is a longitudinal sectional view of an oleo strut embodying the present invention, in which the telescopic members of the strut are shown in their fully extended positions; and FIG. 2 is a longitudinal sectional view similar to FIG. 1, in which the telescopic members are shown in their fully contracted positions.

As illustrated in the drawing, a preferred embodiment of the present invention comprises a plunger 10 and a cylinder 20 cooperatively associated for telescoping movement with respect to each other between predetermined extended and contracted positions. The plunger 10 is a tubular member closed at its upper and lower ends by plugs 11 and 12 such that the interior of the plunger constitutes a cylindrical cavity 15. The cylinder 20 is also a tubular member closed at its lower end by a cap 21 and open at the upper end such that the interior of the cylinder forms a cylindrical cavity 22 slidably receiving plunger 10 is pressure-tight relationship.

It should be noted that the inner wall of cavity 22 is formed so as to provide a radial shoulder 23 intermediate the ends of cylinder 20, and that plug 12 at the lower end of plunger 10 is provided with a radially extending portion of a diameter sufficiently large to form a radial shoulder 13 suitable for engagement with shoulder 23 such as to establish the predetermined extended positions of plunger 10 and cylinder 20 mentioned above. It should also be noted that plug 12 is provided with an opening 14 forming a fluid-conducting passageway interconnecting plunger cavity 15 and cylinder cavity 22 so that said cavities cooperates to constitute a unitary fluid-pressure chamber having end walls formed by plug 11 at the upper end of plunger 10 and by cap 21 at the lower end of cylinder 20. Thus, telescoping movements of plunger 10 and cylinder 20 will result in corresponding variations in the volume of the chamber.

A free piston 30 is slidably disposed in plunger cavity 15 for dividing the unitary chamber into upper and lower compartments capable of holding pressurized fluid such that a pressurized gas in one compartment is prevented from mingling with a liquid in the other compartment and such that the pressure of the gas is transmitted to the liquid as an internal force continuously urging plunger 10 and cylinder 20 toward the extended positions shown in FIG. 1. The upper compartment identified by reference numeral 31 comprises an upper portion of cavity 15 and the hollow 11' in plug 11; whereas, the lower compartment identified by numeral 32 comprises hollow 30' in piston 30 and lower portions of cavity 15 and cylinder cavity 22. Associated with piston 30 and plunger 10 is a spring which, according to the drawing, is the compression spring 34 disposed in the lower portion of plunger cavity 15 between piston 30 and the end wall (plug 12) of plunger 10 such that the forces involved in compressing the spring to the condition shown in FIG. 1 are confined entirely within the structure comprising the plunger.

In describing the operation of the oleo strut shown in the drawing, attention is directed to the following conditions in FIG. 1: (a) shoulders 13 and 23 are in contact such that further movement of plunger 10 outwardly of cylinder 20 is prevented; (b) compartment 31 is assumed to be charged with pressurized gas such that spring 34 is fully compressed by piston 30; (c) as a result of (a) and (b) compartment 32 is characterized by a specific volume; and (d) compartment 32 is assumed to be filled to capacity by a like volume of liquid. And, let it be further assumed, for example, that the pressure magnitude of the pressurized gas in pounds per square inch is sufficient to provide a force of 350 pounds acting on piston 30, and that 150 pounds of this force is required to compress spring 34 to the fully closed condition seen in FIG. 1.

In view of the above-stated conditions, it is obvious that the force produced by the gas pressure exceeds the force of the spring by 200 pounds, but in spite of this force difference acting downwardly on piston 30, the liquid in compartment 32 is not pressurized because further movement of piston 30 downwardly in cavity 15 is prevented by plug 12 and fully compressed spring 34. However, when external forces identified by arrows F and F' are applied to the strut at fitting 18 on top of plunger 10 and at lug portion 21' of cap 21 in the directions indicated by the arrows, the liquid in compartment 32 is not only pressurized by these forces but, when F and F' are of a magnitude such as to cause the liquid to act against piston 30 with a force slightly in excess of the 200 pound force-difference, plunger 10 and cylinder 20 will begin to move from their extended positions toward their contracted positions shown in FIG. 2. Thus, it should be evident that the magnitude of the external forces required to start the telescopic movements of plunger 10 and cylinder 20 from their extended positions toward their predetermined contracted positions is considerably less than the force applied to the piston by the pressurized gas. In fact, the magnitude of the external forces is less by an amount substantially equal to the magnitude of the force exerted by the spring against the piston. This arrangement of spring 34 for providing a force acting against piston 30 in opposition to the force applied to the piston by the pressurized gas in compartment 31 is an important feature of the oleo strut because of its effectiveness for minimizing the forces of impact and rebound transmitted to an aircraft during a landing maneuver at the instant of landing gear touchdown.

As plunger 10 and cylinder 20 move telescopically under the influence of forces F and F' from their extended positions in FIG. 1 toward their contracted positions in FIG. 2, piston 30 moves upwardly in cavity 15 as a result of an increase in the force exerted on the piston by the liquid in compartment 32. Moreover, when the distance traveled by the piston is such that spring 34 exerts no force against the piston, the pressure magnitude of the liquid equals the pressure magnitude of the gas, and further upward movement of piston 30 results from increases in the force applied to the piston by the liquid, which increases are caused by corresponding increases in the magnitude of forces F and F'. Thus, it is apparent that the effectiveness of spring 34 to oppose the action of piston 30 decreases from a maximum effort to zero as the plunger 10 and cylinder 20 move from their extended positions a predetermined distance toward their contracted positions.

When forces F and F' have reached a preselected value, plunger 10 and cylinder 20 will have moved to their predetermined contracted positions determined by contact between plug 12 and cap 21 at the bottoms of the plunger and the cylinder as shown in FIG. 2. Under such conditions, the liquid in lower compartment 32 has forced piston 30 upwardly in cylindrical cavity 15 until the piston is in contact with the bottom of plug 11 which, in turn, has caused a reduction in the capacity of upper compartment 31 such that the pressurized gas in this compartment is forced to occupy the space defined by hollow 11' in the bottom of the plug.

This forcing of the pressurized gas into a smaller space increases the expansive properties of the gas because of an increase in the gas pressure magnitude. Hence, a sudden decrease in the effectiveness of forces F and F' would permit the increased expansive properties of the gas to act instantly and force piston 30 downwardly in cavity 15 against the liquid in the lower compartment 32 such that plunger 10 and cylinder 20 are moved rapidly toward their extended positions. However, when the downwardly moving piston strikes spring 34, much of the energy involved in the rapid movement of the piston and cylinder will be absorbed in compressing spring 34 by the time piston 10 and cylinder 20 have reached their predetermined extended position.

In describing FIG. 1, it was stated that compartment 32 is provided with a specific volume because of the contact between shoulders 13 and 23 and the fully compressed condition of spring 34 effected by piston 30. However, it is to be noted that the volume of compartment 32 may be more or less than the specific volume identified above since the amount of liquid in the compartment is the determining factor. For instance, if the quantity of liquid is less than the above-mentioned specific volume, spring 34 is fully compressed by piston 30 but shoulders 13 and 23 are not in contact because plunger 10 drops downwardly in the cavity 22 of cylinder 20 until the volume of compartment 32 equals the volume of liquid. This condition is indicated in FIG. 1 by dotted lines 16 which represents a lower position of plunger 10 in the cavity 22 of cylinder 20.

On the other hand, when the quantity of liquid is more than the above-mentioned specific volume, shoulders 13 and 23 are in contact but spring 34 is not fully compressed by piston 30. In this instance, the piston is moved upwardly in the cavity 15 of plunger 10 as a result of a combination of forces applied to the bottom of piston 30 by the spring 34 and the liquid in compartment 32. Stated differently, if the pressure of the gas in the upper compartment 31 is such as to provide a force of 350 pounds acting on piston 30 and spring 34 is pushing on the bottom of the piston with a force of 140 pounds, the liquid in compartment 32 is pressurized by a force equal to the difference between 350 and 140 or 210 pounds. This condition is indicated in FIG. 1, where dotted lines 17 represent the top of piston 30 in a different position resulting from the increased volume of liquid in compartment 32. Thus, the pressurized gas in compartment 31 is exerting a force of 210 pounds against the body of liquid in compartment 32 which, in turn, causes forces of the same magnitude to be applied to the top and bottom end walls, viz., plug 11 and cap 21, of the unitary chamber such that plunger 10 and cylinder 20 are urged to their predetermined extended positions by a force of 210 pounds. Consequently, to begin telescopic movement of the plunger and cylinder toward their contracted positions, the magnitude of F and F' must exceed the 210-pound force.

From the above description of the present invention, it can be seen that small-sized oleo struts for aircraft landing gear can be provided in which highly pressurized gas is employed to provide the landing gear with adequate standoff abilities without the increased stiffness normally associated with landing gear struts charged with high-pressure gas; that small-sized landing gear struts can be provided in which the forces of impact occurring at the moment of touchdown of a landing aircraft are reduced without decreasing the shock-absorbing and cushioning abilities of the struts; and that such struts can be provided for aircraft landing gear in which the rebound tendencies associated with a landing aircraft are effectively minimized.

What is claimed as new is:

1. In a landing-gear oleo strut for an aircraft, the combination comprising:

first and second generally cylindrical members respectively defining first and second cylindrical cavities, said members being constructed and arranged such that the first member is slidably received in the second cylindrical cavity for telescoping movement of the first and second members between preselected extended and contracted positions, said first member including an end wall having an opening fluid-conductively interconnecting the first and second cavities so that said cavities cooperate to constitute a unitary fluid-pressure chamber of a character such that any telescoping movement of said members causes variations in the volume of said chamber;

means associated with the first cylindrical member for drividing the unitary chamber into first and second discrete compartments such that pressurized gas filling the first compartment is prevented from mingling with a body of liquid filling the second compartment, said means comprising a free piston slidably received in the first cylindrical cavity for dividing said first cavity into variable-volume first and second portions of a character such that said first portion constitutes the first compartment of the unitary chamber, and such that said second portion cooperates with the opening in the end wall of the first member and the second cylindrical cavity to constitute the second compartment of said unitary chamber, said free piston being movably responsive to the pressurized gas filling the first compartment such that the pressure of said gas acting on the piston produces a first force continuously pressurizing the body of liquid filling the second compartment for continuously urging the first and second cylindrical members toward their preselected extended positions, and movably responsive to said body of liquid such that telescoping movement of said cylindrical members toward their contracted positions is effective for decreasing the volume of the first compartment and thereby increasing the pressure magnitude of the gas filling said first compartment; and a helical compression spring disposed in the second portion of the first cylindrical cavity between the free piston and the end wall of the first cylindrical member for providing a second force acting against said free piston such that the magnitude of said second force increases in response and proportion to movement of the free piston by pressurized gas filling the first compartment, and such that said second force operates to oppose the first force so that the effect of the first force for continuously urging the first and second cylindrical members toward their extended positions is reduced to the extent that forces required to commence telescoping movement of said cylindrical members from their preselected extended positions toward their contracted positions are substantially less than the magnitude of the first force, and such that continuation of the telescoping movemen of the first and second cylindrical members toward their contracted positions operates to diminish the effect of said second force.

2. A combination according to claim 1 in which the compression spring is constructed and arranged such that the second force is a predetermined maximum when the first and second cylindrical members are disposed in their preselected extended positions, and such that said second force diminishes to zero and the full magnitude of the first force becomes effective for pressurizing the body of liquid filling the second compartment when said cylindrical members have moved a predetermined distance from their extended positions toward their preselected contracted positions.

3. In a landing-gear oleo strut for an aircraft, the combination comprising:

first and second generally cylindrical members respectively defining first and second cylindrical cavities, said members being constructed and arranged for telescoping movement relative to each other between preselected extended and contracted positions, and such that said cavities are fluid-conductively interconnected so as to constitute a unitary fluid-pressure chamber of a character such that any telescoping movement of said members causes variations in the volume of said chamber;

first means associated with the first cylindrical members so as to cooperate with the first cavity for dividing the unitary fluid-pressure chamber into first and second discrete compartments such that pressurized gas filling the first compartment is prevented from mingling with liquid filling the second compartment, said first means being constructed and arranged so as to movably respond to the pressurized gas filling the first compartment and the liquid filling the second compartment such that the pressure of said gas is effective as a force continuously pressurizing said liquid for continuously urging the first and second cylindrical members toward their preselected extended positions, and such that said liquid is effective for moving said first means for decreasing the volume of the first compartment for increasing the pressure of said gas in response to telescoping movement of said cylindrical members toward their contracted positions; and yieldable means cooperatively associated with the first cylindrical member and the first means such that movement of the first and second cylindrical members toward their extended positions is effective for providing a counterforce acting on said first means in opposition to the first named force such that the effectiveness of said first named force for continuously urging the first and second members toward their extended positions is reduced substantially when movement of said members toward their extended positions exceeds a predetermined magnitude, said yieldable means comprising a compressible resilient element compressibly arranged with respect to the first means and one end of the first cylindrical member such that movement of the first means by pressurized gas filling the first compartment is effective for compressing said resilient element for providing the counter force when telescoping movement of the cylindrical members toward their extended positions exceeds a predetermined portion of the distance between the contracted and extended positions of said cylindrical members.

4. A combination according to claim 3 in which the compressible resilient element is constructed and arranged such that the magnitude of the counter force is maximum when the first and second cylindrical members are disposed in their preselected extended positions, and such that said counter force diminishes to zero when the telescoping movement of the cylindrical members toward their contracted positions exceeds a predetermined portion of the distance between the extended and contracted positions of said cylindrical members.

5. A combination according to claim 4 in which the compressible resilient element is interposed between the first means and one end of the first cylindrical member.

6. A combination according to claim 4 in which the compressible resilient element comprises a helical compression spring.

7. A combination according to claim 6 in which the helical compression spring is positioned between the first means and one end of the first cylindrical member.

References Cited in the file of this patent

UNITED STATES PATENTS

| 2,186,266 | Onions | Jan. 9, 1940 |
| 2,805,853 | Mercier | Sept. 10, 1957 |
| 3,083,000 | Perdue | Mar. 26, 1963 |

FOREIGN PATENTS

| 248,997 | Switzerland | May 31, 1947 |
| 581,417 | Great Britain | Oct. 11, 1946 |
| 1,185,526 | France | Feb. 16, 1959 |